US 8,548,934 B2

(12) United States Patent
Lay et al.

(10) Patent No.: US 8,548,934 B2
(45) Date of Patent: Oct. 1, 2013

(54) SYSTEM AND METHOD FOR ASSESSING RISK

(75) Inventors: William Michael Lay, Glenwood, MD (US); Yi Wu, Silver Spring, MD (US); Fan Tao Pu, Potomac, MD (US); Alain Kouyaté, Silver Spring, MD (US)

(73) Assignee: Infozen, Inc., Rockville, MD (US)

( * ) Notice: Subject to any disclaimer, the term of this patent is extended or adjusted under 35 U.S.C. 154(b) by 862 days.

(21) Appl. No.: 12/694,243

(22) Filed: Jan. 26, 2010

(65) Prior Publication Data

US 2011/0119211 A1    May 19, 2011

Related U.S. Application Data

(60) Provisional application No. 61/261,873, filed on Nov. 17, 2009.

(51) Int. Cl.
*G06N 5/02* (2006.01)
(52) U.S. Cl.
CPC ....................................... *G06N 5/02* (2013.01)
USPC ........................................................... 706/46
(58) Field of Classification Search
None
See application file for complete search history.

(56) References Cited

U.S. PATENT DOCUMENTS

| 7,558,767 | B2 * | 7/2009 | Scarborough et al. | 706/21 |
| 2005/0065872 | A1 * | 3/2005 | Moebs et al. | 705/38 |
| 2009/0089107 | A1 * | 4/2009 | Angell et al. | 705/7 |

OTHER PUBLICATIONS

Calderon, Thomas G. et al.; "A roadmap for future neural networks research in auditing and risk assessment"; 2002; International Journal of Accounting Information Systems; pp. 203-236.*
Holton, Carolyn; "Identifying disgruntled employee systems fraud risk through text mining: A simple solution for a mult-billion dollar problem"; available online 2008; ELSEVIER; Decision Support Systems (2009); pp. 853-864.*

* cited by examiner

*Primary Examiner* — Jeffrey A Gaffin
*Assistant Examiner* — Stanley K Hill
(74) *Attorney, Agent, or Firm* — McNeely, Hare & War LLP; Kevin J. McNeely

(57) ABSTRACT

The invention describes systems and methods of assessing risk using a computer. A computer-based system including an enrollment module, a data aggregation module, a risk assessment module, and a memory is provided for assessing risks. The enrollment receives, at a computer, personal information regarding at least one entity. The data aggregation module receives, at the computer, risk information regarding the entity according to the personal information from at least one data source. The risk assessment module converts the risk information to assessment information. The memory stores the personal information, the risk information, and/or the assessment information on the computer.

14 Claims, 5 Drawing Sheets

SYSTEM AND METHOD FOR ASSESSING RISK

CROSS REFERENCE TO RELATED APPLICATIONS

This utility patent application claims priority to U.S. provisional patent application Ser. No. 61/261,873 filed on Nov. 17, 2009.

TECHNICAL FIELD

The present disclosure relates to a system and method for assessing risk.

BACKGROUND

Current security threat assessment and fraud detection programs are moving towards a risk-based approach to ensure that entitlement programs, infrastructures, data, and systems are protected from improper use or criminal activity. This risk-based approach requires a significant amount of automation of the threat assessment and fraud detection process and a solid quality assurance process that tracks the quality of a risk assessment process.

However, current risk assessment processes present several major challenges. Unstructured data sources used in the assessment process are hard to convert into a format suitable for an automated assessment. Additionally, non-standard data vocabulary and complicated data semantics are difficult to use by traditional systems such as rule-based engines. Given these challenges, much of the risk assessment processes are manually operated, accuracy rates are less than optimal, and therefore the likelihood of fraud, criminal activity, and other types of risk, increase.

SUMMARY

Embodiments of the present disclosure provide an automated accurate risk assessment process. Additional features and utilities are set forth and/or are obvious from the description provided below.

One or more embodiments of the present disclosure are related to a system or a method of assessing risk using a computer. According to one aspect, a computer-based system of assessing risks includes an enrollment module to receive, at a computer, personal information regarding at least one entity, a data aggregation module to receive, at the computer, risk information regarding the at least one entity according to the personal information from at least one data source, a risk assessment module to automatically convert the risk information to assessment information, and a memory to store the personal information, the risk information, and/or the assessment information on the computer.

According to another aspect, a method of assessing risks using a computer includes receiving personal information regarding at least one entity at the computer, gathering risk information regarding the at least one entity according to the personal information from at least one data source, automatically converting the risk information to assessment information, and storing the personal information, the risk information, and/or the assessment information in a memory on the computer.

According to another aspect, a computer-readable recording medium containing computer-readable codes provides commands for computers to execute a process including receiving personal information regarding at least one entity at the computer, gathering risk information regarding the at least one entity according to the personal information from at least one data source, automatically converting the risk information to assessment information, and storing the personal information, the risk information, and/or the assessment information in a memory on the computer.

The system, method and/or computer-readable recording medium may include one or more of the following features. The risk information may include criminal history, civil history, terrorist watch lists, traffic violations, loan or debt delinquencies, outstanding wants or warrants, academic disciplinary history, and/or immigration status. In another embodiment, the risk information includes infraction information, punishment information, and disposition information that correspond to the personal information of the at least one entity.

The infraction information, punishment information, and disposition information may be automatically converted to standardized codes by assigning numerical values including an infraction code that corresponds to the infraction information, a punishment code that corresponds to the punishment information, and a disposition code that corresponds to the disposition information.

An adjudication module may be used to determine a level of risk corresponding to the at least one entity according to the assessment information. The level of risk corresponding to the at least one entity may be determined according to adjudication parameters received by the adjudication module. The adjudication parameters may be received from a user and input into the computer or received from a client over a network.

The standardized infraction code may be derived from infraction information by pre-processing the infraction information and using a predictive model to classify the infraction information into the infraction code along with a confidence factor for the classification. The standardized punishment code may be derived from punishment information by pre-processing the punishment information and using the predictive model to classify the punishment information into the punishment code along with a confidence factor for the classification. The standardized disposition code may be derived from disposition information by pre-processing the disposition information and using the predictive model to classify the disposition information into the disposition code along with a confidence factor for the classification.

As another feature, pre-processing of the infraction information, the punishment information, and/or the disposition information may be performed. For example, a number of text-string substitutions may be performed to normalize the language of the infraction information, the punishment information, and/or the disposition information. Unnecessary text may be removed from the infraction information, the punishment information, and/or the disposition information. In addition, specific phrases may be created that are based on the proximity of two or more words.

In one embodiment, the predictive model is a statistical pattern learning model which is trained to predict classifications by using examples of text already classified.

BRIEF DESCRIPTION OF THE DRAWINGS

The drawings are meant to illustrate certain principles of the invention and are not therefore to be considered to limit its scope. The above-mentioned features and objects of the present disclosure will become more apparent with reference to the following description taken in conjunction with the accompanying drawings wherein like reference numerals denote like elements in which.

DETAILED DESCRIPTION

Figure 1:
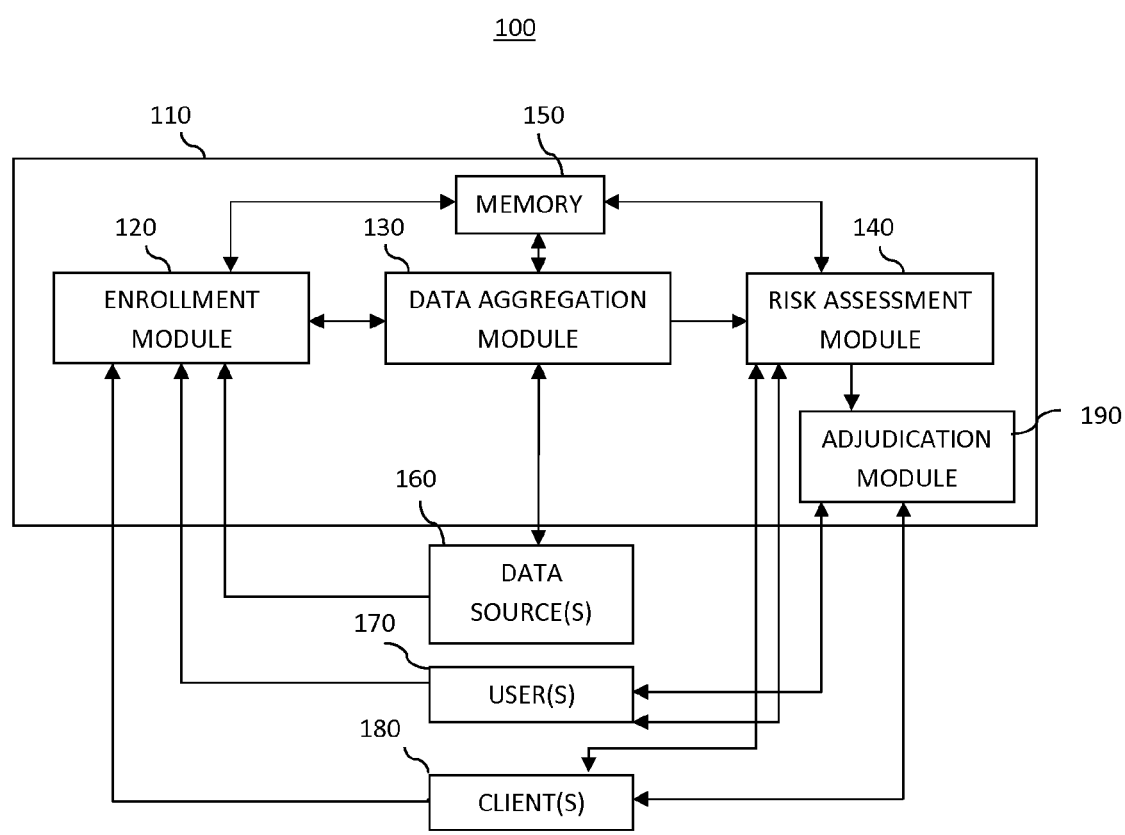
FIG. 1 is a block diagram illustrating a computer system to assess risk according to one or more embodiments of the present disclosure.

Reference will not be made in detail to the exemplary embodiments of the present disclosure, examples of which are illustrated in the accompanying drawings, wherein like reference numerals refer to like elements throughout. The embodiments are described below so as to explain the present disclosure by referring to the figures. Repetitive description with respect to like elements of different exemplary embodiments may be omitted for the convenience of clarity.

Embodiments of the present disclosure provide an automated accurate risk assessment process. The present disclosure addresses major challenges regarding risk assessment, such as: unstructured data sources which are hard to convert into a format conducive to an automated assessment; non-standard data vocabulary and complicated data semantics which make the interpretations of the data by computer systems difficult; and complex and changing program policies which require computer systems to adapt to rapid policy changes.

The present disclosure provides systems and methods of assessing risk using a computer. According to one embodiment, a computer-based system 100 is provided for assessing risks. As illustrated in FIG. 1, the computer-based system 100 includes a computer 110. As discussed above, a computer 110 can be a server computer. A server computer should be understood to refer to a service point which provides processing, database, and communication facilities. By way of example, and not limitation, the term server can refer to a single, physical processor with associated communications and/or data storage and/or database facilities, or it can refer to a networked or clustered complex of processors and associated network and/or storage devices, as well as operating software and one or more database systems and/or applications software systems (which can be implemented as modules and/or engines) which support the services provided by the server.

Several non-limiting examples of a computer 110 are a personal computer (e.g., desktop computers or laptop computers), personal digital assistants (PDAs), wireless devices, cellular telephones, internet appliances, media players, home theater systems, media centers, and the like. The computer 110 may also include a plurality of computers connected to teach other through a network. For the purposes of this disclosure, a computing device includes a processor and memory for storing and executing program code, data and software, and may be provided with an operating system that allows the execution of software applications in order to manipulate data. The computer 110 can include one or more input devices, e.g., keyboard, keypad, mouse, etc. and input device interface, for example: a display, such as a screen or monitor, which can be specified using any of a number of languages, including without limitation, a markup language such as Hypertext Markup Language, scripts, applets and the like.

Additionally, the computer 110 may receive and/or transmit personal information, risk information, assessment information, and/or adjudication information from one or more users 170 and/or clients 180 through storage media, wired connections, wireless connections, the internet, Internet, or any other type of communication network using transmission control protocol (TCP) and Internet Protocol (IP). Users 170 may utilize the computer via an input device, such as a keyboard or a mouse. Clients 180 may be computers connected to computer 110 through a network. For example, the computer 110 may receive or transmit these types of information through a flash memory drive, disc media (i.e., CD, DVD, Blu-Ray), a wired network connection (i.e., the internet), or a wireless connection.

The computer 110 may include an enrollment module 120, a data aggregation module 130, a risk assessment module 140, an adjudication module 190, and a memory 150. The modules are not required to be on a single computer 110. The modules may each be located on the computer 110, or may be located on separate computers connected to the computer 110 over a network, such as the Internet. The memory 150 may be a fixed disk where an operating system, application programs, and/or data may be stored. For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application and implemented by at least one processor of a computing device.

The enrollment module 120 may receive, at the computer, personal information regarding at least one entity. As used herein, the term "entity" refers to any person, company, group of people, organization, government entity, and the like, that may pose any kind of risk. For example, an entity may be a person, a group of people, an organization, a corporation, a co-operation, an association, a country, a state, a city, a municipality, etc. As used herein, the term "personal information" refers to any information that can uniquely identify an entity. For example, if the entity is a single person, personal information may include biographic information (e.g., name, address, phone number, social security number, birth date, company's stock symbol, etc.), biometric information (e.g., fingerprints, face recognition, DNA, hand and palm geometry, iris recognition, odor/scent, etc.), and the like. Personal information may refer to an single unique identifier, such as a fingerprint, or several pieces of information that when taken together can refer only to a single entity, i.e., a name, birth date, and address. Additionally, personal information may refer to biographic information and biometric information.

The data aggregation module 130 may receive, at the computer, risk information regarding the entity according to the personal information from at least one data source 160. As used herein, the term "risk information" refers to any quantifiable information that may be considered as indicative of risk. For example, risk information may include criminal history, civil history, terrorist watch lists, traffic violations, loan or debt delinquencies, outstanding wants or warrants, academic disciplinary history, and/or immigration status. Risk information may also include accusations relating to the previously mentioned types of risks. For example, a security company may want to know whether potential employees have a criminal record. In this example, risk information would include any information that relates to the criminal history of a job applicant. In another example, the federal government may want to know what health care companies have unacceptably high levels of fraud, or accusations of fraud, relating to insurance claims. In this example, risk information may include any information that relates to fraud claims or accusations relating to the health care companies. In another example, a company may want to know whether a country poses a risk for investment purposes. In this example, risk information may include inflation or deflation rates, debt amount, debt to GDP ratio, interest rates, etc.

For example, the data source 160 may be a database, electronic documents, the internet, paper files, and the like. The risk assessment module 140 may convert the risk information to assessment information. The term "assessment information" as used herein refers to risk information that has been quantified. For example, if a job applicant has a criminal background, each criminal charge, disposition, and punishment may be quantified. The conversion from risk information to assessment information may be manual or automatic. Risk information may be converted from unstructured data sources using a non-standard data vocabulary and complicated data semantics to assessment information using standardized vocabulary and values. The memory 150 may store the personal information, the risk information, and/or the assessment information on the computer 110.

According to another embodiment, the system 100 may also include an adjudication module 190 to determine a level of risk corresponding to the at least one entity according to the assessment information. The adjudication module 190 may be accessible to a user 170 or a client 180 through storage media, wired connections, wireless connections, the internet, Internet, or any other type of communication network using transmission control protocol (TCP) and Internet Protocol (IP). The computer 100 may include the adjudication module 190, or the adjudication module 190 may be on storage media, the internet, flash drives, external hard drives, and the like.

The risk information may be converted to assessment information using an algorithm. The algorithm may use logical expressions to automatically convert unstructured text into numeric values. The algorithm may be developed in the following manner in a criminal background context. Criminal backgrounds are usually obtained using rap sheets that may contain information spanning several decades, jurisdictions, states, etc. Each jurisdiction may add information to the rap sheets in an unstructured non-standardized manner. For example, each jurisdiction may have a unique way of classifying the same crime, the classifications and crimes may change over time, there may be typographical errors that are never fixed, and other various differences or errors that cause inconsistencies in the data.

Figure 5:
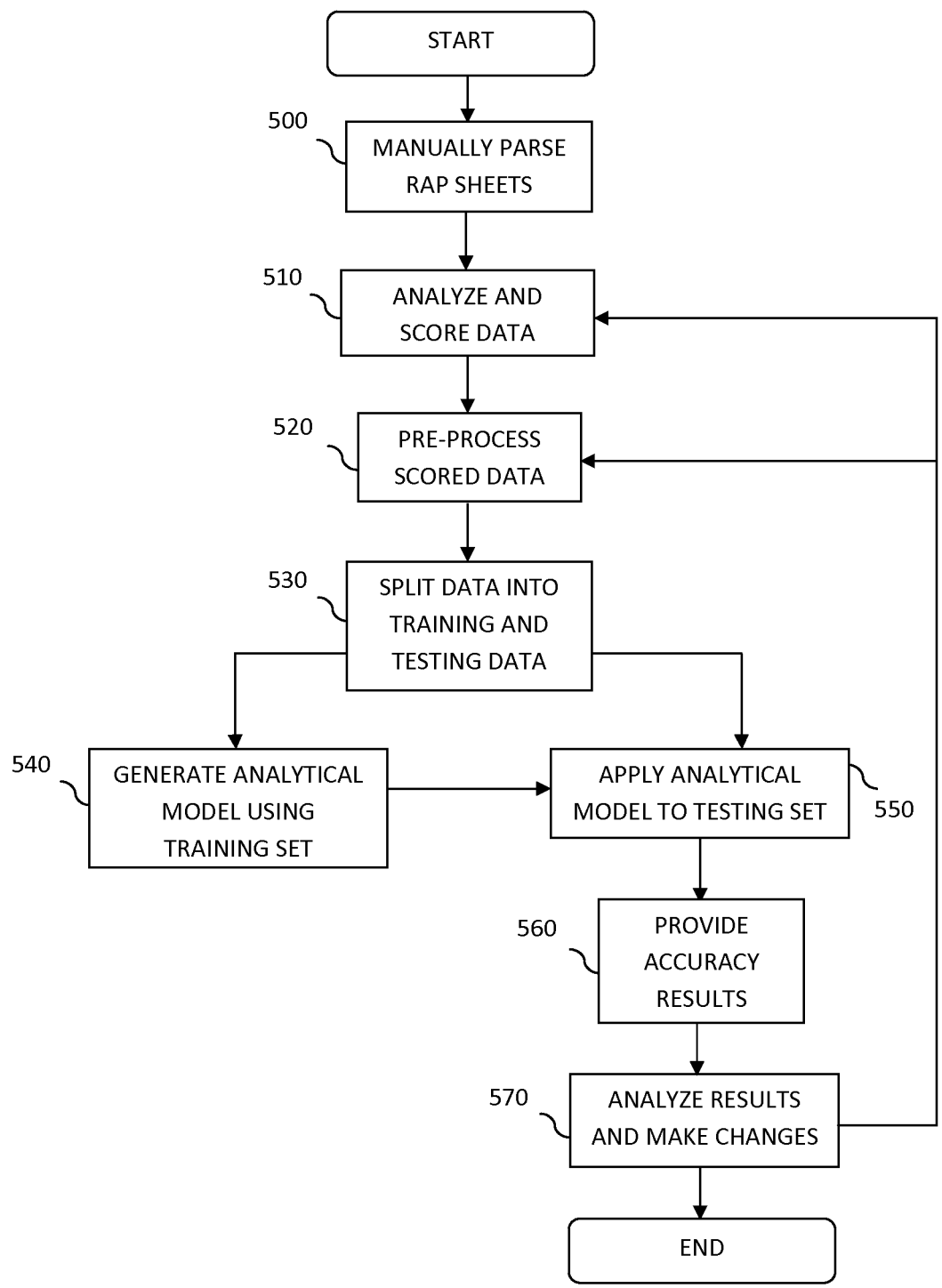
FIG. 5 is a flow chart illustrating the creation of a predictive model from which the algorithm is developed.

To develop the algorithm to automatically convert the inconsistent data (risk information) to standardized assessment information, a training model may be built. FIG. 5 is a flow chart illustrating the creation of a predictive model from which the algorithm is developed. The predictive model may be a statistical pattern learning model which is trained to predict classifications by using examples of text already classified. The predictive model may be built by parsing a number of rap sheets manually to extract the following pieces of data: charges, arrest dates, court dates, disposition, sentences, etc (operation 500). This data may then be analyzed and scored, i.e., standardized to account for any inconsistencies (operation 510). The scoring may be done by an expert in the subject matter. In the present example, involving rap sheets, a subject matter expert may be a retired police officer, FBI agent, corrections officer, and the like. The expert may go through rap sheets, line by line, standardizing the unstructured data. The scored data may then be pre-processed to remove extraneous information from the standardized data (operation 520). The pre-processing may include replacing specific words, tokens, or phrase with more text-minding friendly words, tokens, and phrases. The rap sheets may be split into a testing set and a training set (operation 530). Logical expressions may be developed as an analytical model based on the manual scoring and pre-processing of the rap sheets as part of the development of the predictive model (operation 540). The algorithm may utilize these logical expressions to convert the risk information to assessment information.

Once the predictive model is developed, new rap sheets may be automatically processed by the algorithm using the logical expressions of the predictive model to produce testing data. The predictive model may then process new rap sheets to produce testing data to predict the assessment information according to the logical expressions (operation 550). The accuracy of the prediction of the assessment information may be provided to a user based on the predictive model's confidence in the accuracy of the automatic conversion from risk information to assessment information (operation 560). The accuracy may be provided as a confidence factor, which refers to the predictive model's confidence that the automatic version is accurate. The testing data may be manually reviewed by the experts to determine the accuracy of the training model and to adjust the logical expressions to improve accuracy (operation 570). The process may return to operations S510 and S520 in order to improve the accuracy of the predictive model using additional rap sheets. The more testing data the predictive model processes, the more accurate the predictions become due to improved logical expressions. The predictive model may be part of the risk assessment module 140 and may be updated to improve the accuracy of the predictive model when the risk assessment module 140 is utilized.

The computer system 100 may be used to assess risk or as a quality check for manual risk assessment. Risk information that has been manually processed for adjudication may be fed into the computer system 100 to automatically determine the level of risk using the predictive model. The manually generated risk assessment may be compared against the automatically generated risk assessment. The accuracy level of the manual risk assessment may be determined by this comparison. The person making the manual risk assessment may then learn from the differences between the manual risk assessment and the automatic risk assessment thereby improving the quality of the manual risk assessment.

According to another embodiment, the risk information may include at least one of the following: infraction information, punishment information, and disposition information. The infraction information, punishment information, and disposition information may all correspond to the personal information of the at least one entity. As used herein, the term "infraction information" refers to any information that may be indicative of risk. As used herein, the term "punishment information" refers to the severity of the infraction. As used herein, the term "disposition information" refers to a resolution of the infraction information, such as guilt or innocence. For example, in a criminal setting, infraction information may correspond to criminal charges that may be classified using the National Crime Information Center (NCIC) codes. In this example, punishment information may correspond to the severity of the charge, i.e., whether the criminal charges constitute misdemeanors or felonies. Additionally, disposition in a criminal setting may include whether the charge resolved with a finding of convicted, not convicted, or if the resolution is unknown. The risk information may include different types of information that correspond to the type of risk. For example, infraction information, punishment information, and disposition information may apply to criminal information. Additionally, the risk information may include travel information which may include countries visited and dates of those visits.

The risk information can include additional information. For example, in a criminal setting the risk information may include whether a person has served any jail time, whether any probation is part of the sentence, if any fines or restitution requirements have been levied, etc. This type of risk information may be used by the computer 110 to infer disposition information and punishment information. For example, if the person has served jail time and punishment information indicates the person was charged with a felony, but the disposition information is unknown, the computer 110 can infer that the person was convicted based on the fact the person served jail time for the felony. Additionally, if the person has been convicted and fined over $500, but the punishment information relating to the severity of the charge is unknown, the computer 110 can infer that the person was charged with a felony based on the amount of the fine.

According to another embodiment, the infraction information, punishment information, and disposition information may be converted to standardized quantifiable values based on the risk information gathered from the at least one data source 160. The conversion to standardized quantifiable values may be manual or automatic. The computer 110 may automatically convert the infraction information, punishment information, and disposition to standardized quantifiable values using an algorithm in the risk assessment module 140. The algorithm may be specifically programmed to correspond to the type of risk information, i.e., criminal history, civil history, terrorist watch lists, traffic violations, loan or debt delinquencies, outstanding wants or warrants, academic disciplinary history, and/or immigration status. The algorithm may use logic expressions to convert the risk information to assessment information. For example, a logic expression to convert infraction information, in this example a criminal charge, to "SEXUAL_ASSAULT" or NCIC code "11" may be: "SEX(UAL)?\s+ASS(UA|AU)LT." The logic expression may include other alternative or potential spellings or phrases that convey a similar charge, such as "forcible sexual intercourse." Additionally, a logic expression may convert punishment information to "FELONY," "MISDEMEANOR," or "UNKNOWN." Additionally, a logic expression may convert disposition information to "CONVICTED," "NOT CONVICTED," or "UNKNOWN."

Additionally, punishment information or disposition information may be determined according other portions of the risk information. For example, the risk information regarding a criminal charge may include jail time, which can be converted into punishment information and disposition information. In this example, punishment information may be determined according to a punishment length. The punishment length may be converted to standardized format using the following logic expression: "(DAS?|DAYS?)(?:\s|\p[Punct]|S)." This logical expression may be interpreted as: find any substring beginning with the letters "DA" optionally followed by the letter "S" or beginning with the letters "DAY" optionally followed by the letter "S" where following letters must be either a "whitespace" character, some punctuation character, or the end of the string. When the text indicating punishment length falls within the parameters of the logical expression, the first group of characters is replaced by a standardized code corresponding to a punishment length. The standardized punishment length is then converted to punishment information. Additionally, if jail time has been served, the disposition information may be inferred as "CONVICTED."

The computer-based system 100 may assess more than one risk or assess different types of information simultaneously. More than one computer-based system 100 may assess one or more risks in tandem with one another. For example, if a risk assessment takes more than one type of risk information, such as criminal history and immigration status, a computer-based system 100 may include multiple risk assessment modules to convert both types of risk information into assessment information. Alternatively, a first computer-based system may process the criminal history risk information, and a second computer-based system may process the immigration status risk information.

According to another embodiment, the assessment information may include a standardized infraction code that corresponds to the infraction information, a punishment code that corresponds to the punishment information, and a disposition code that corresponds to the disposition information. According to another embodiment, the assessment information may be quantified by assigning numerical values as the standardized infraction code, the punishment code, and the disposition code.

For example, in a criminal setting, person A may have been charged with "intimidating a witness." This infraction information may be automatically converted to standardized infraction code "THREATS" which corresponds to NCIC code 16. If person A faces more than 1 year (365 days) in prison for such a criminal charge, the punishment information may be automatically converted to standardized punishment code "FELONY." If person A is found guilty, the disposition information is converted standardized disposition code "CONVICTED." Therefore, in this example, person A has been charged with "intimidating a witness," faces over 365 days in prison, and has been "convicted." Accordingly, the system 100 may automatically convert the infraction information "intimidating a witness" to "THREATS," the punishment information from ">365 days" to "FELONY" and from "guilty" to "CONVICTED." Furthermore, the system 100 may automatically convert the infraction information from "THREATS" to "16" to correspond to the NCIC code, the punishment information from "FELONY" to "1" as a ternary value, and "CONVICTED" to "2" as a ternary value. Depending on a potential sentence length, the punishment information may be converted to "MISDEMEANOR" or "0," and if the punishment information is not clear, the punishment information may be converted to "UNKNOWN" or "2." Additionally, if person A is found not guilty, the disposition information may be converted to "NOT CONVICTED" or "1," and if the disposition information is not clear, the disposition information may be converted to "UNKNOWN" or "0."

According to another embodiment, the level of risk may correspond to the at least one entity is determined according to adjudication parameters received by the adjudication module 190. For example, a client 180 may be a security company looking to hire a new employee. The client 180 may assess the risk of job applicants by setting adjudication parameters by which to judge the applications. The adjudication parameters may be easily changeable logical expressions that correspond to the standardized vocabulary and values of assessment information. The adjudication parameters can rapidly adapt to complex and frequently changing policies of the user 170 or the client 180. The level of risk may be a threshold where if a job applicant fails to conform to the adjudication parameters set by the client 190, the level of risk is above the threshold. If a job applicant conforms to the adjudication parameters set by the client 190, the level of risk is at or below the threshold. The adjudication parameters may include a period of time elapsed from when a particular infraction occurred. If the job applicants exceed the adjudication parameters the security company is willing to accept, than the level of risk corresponding to those applicants. Additionally, the level of risk may be quantified according to the adjudication parameters. For example, the client 190 may set adjudication parameters where a felony is 10 points and a misdemeanor is 5 points. Accordingly, the client 190 may set an acceptable risk level at 24 points, thus any job applicant whose criminal record totals more than 25 points exceeds the quantified risk threshold. In this example, risk information that exceeds the risk threshold may be either a temporary or a permanent disqualifying offense. For example, the client 190 may determine that, for example, a felony that occurred over 10 years ago should not be counted in adjudicating the risk because of the lapse of time since the infraction.

According to another embodiment, the adjudication parameters may be received from a user 170 and may be manually input into the computer 110 or received from a client 180 over a network. The network include wired connections, wireless connections, the internet, Internet, or any other type of communication network using transmission control protocol (TCP) and Internet Protocol (IP).

Figure 2:
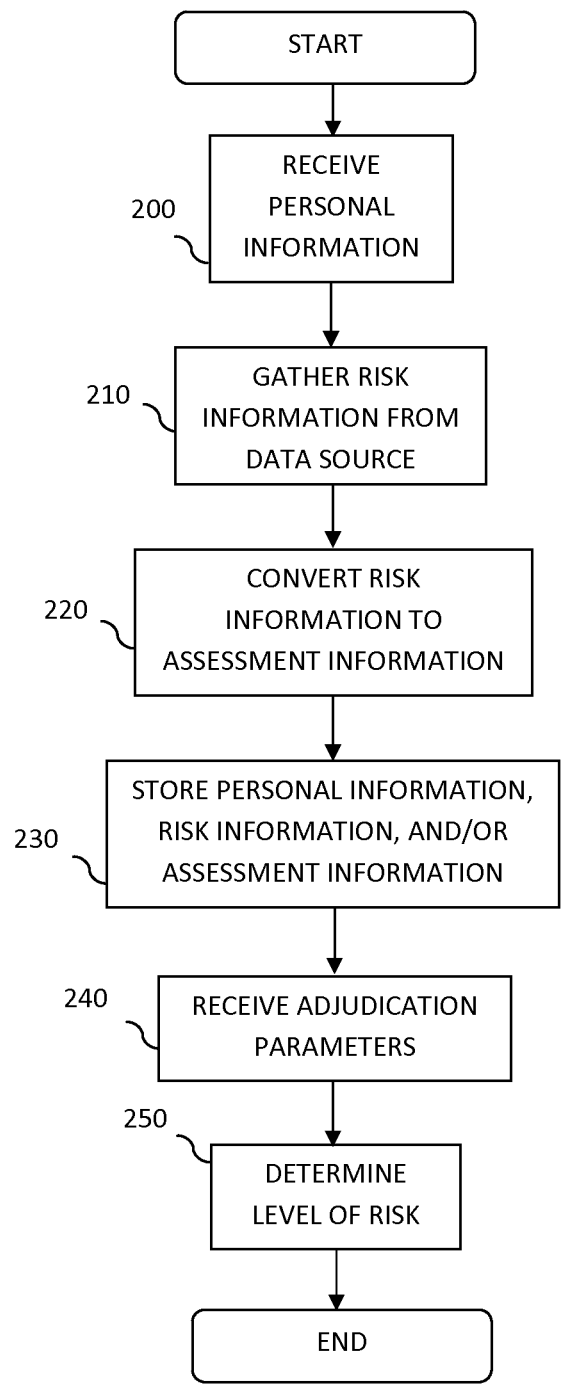
FIG. 2 is a flow chart illustrating a method of assessing risk according to one or more embodiments of the present disclosure.

FIG. 2 illustrates a method of assessing risks using a computer. In operation 200, personal information regarding at least one entity is received at the computer. In operation 210, risk information regarding the at least one entity is gathered according to the personal information from at least one data source 160. In operation 220, the risk information is converted to assessment information. In operation 230, the personal information, the risk information, and/or the assessment information are stored in a memory 150 on the computer 110. The conversion of risk information to assessment information may be manual or automatic.

Figure 3A:
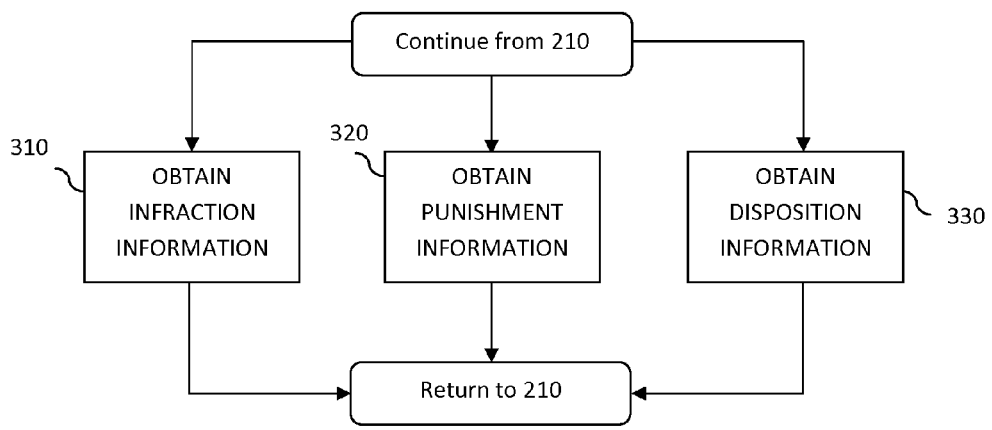
FIG. 3A is a flow chart illustrating a method of gathering risk information according to one or more embodiments of the present disclosure.

FIG. 3 illustrates a method of gathering of the risk information (operation 210). The gathering of risk information in operation 210 may include obtaining infraction information (operation 310), punishment information (operation 320), and disposition information (operation 330) that correspond to the personal information of the at least one entity.

Figure 3B:
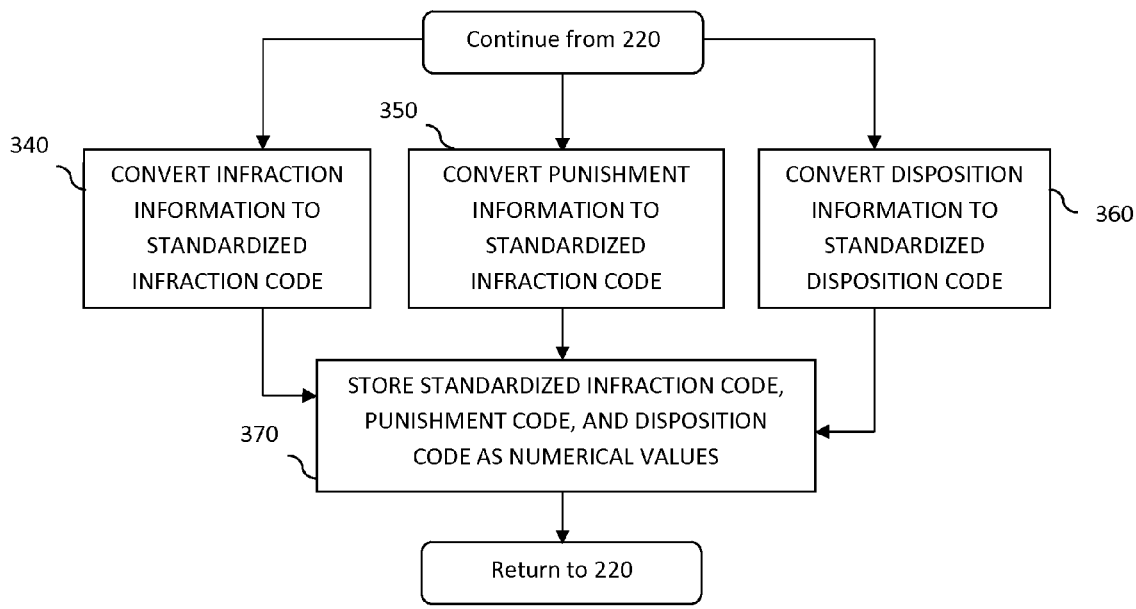
FIG. 3B is a flow chart illustrating a method of converting risk information to assessment information according to one or more embodiments of the present disclosure.

According to another embodiment, the conversion of the risk information to assessment information (operation 220) may include converting the infraction information, punishment information, and disposition information to standardized quantifiable values based on the risk information gathered from the at least one data source 160. FIG. 3B illustrates a method of converting risk information to assessment information (operation 220). The conversion of risk information to assessment in operation 220 may include converting the risk information into assessment information may include a standardized infraction code that corresponds to the infraction information (operation 340), a punishment code that corresponds to the punishment information (operation 350), and a disposition code that corresponds to the disposition information (operation 360).

According to another embodiment, the method may further include storing the standardized infraction code, the punishment code, and the disposition code on the computer 110 as numerical values (operation 370). According to another embodiment, the risk information may include criminal history, civil history, terrorist watch lists, traffic violations, loan or debt delinquencies, outstanding wants or warrants, academic disciplinary history, and/or immigration status.

According to another embodiment, the method may further include determining a level of risk (operation 250) corresponding to the at least one entity according to the assessment information. According to another embodiment, the level of risk corresponding to the at least one entity may be determined according to adjudication parameters. According to another embodiment, the method may further include receiving the adjudication parameters (operation 240) by inputting the adjudication parameters into the computer 110 or receiving the adjudication parameters from a client 180 over a network. The adjudication parameters may be received at the computer 110 before the process illustrated in FIG. 2 begins.

Figure 4:
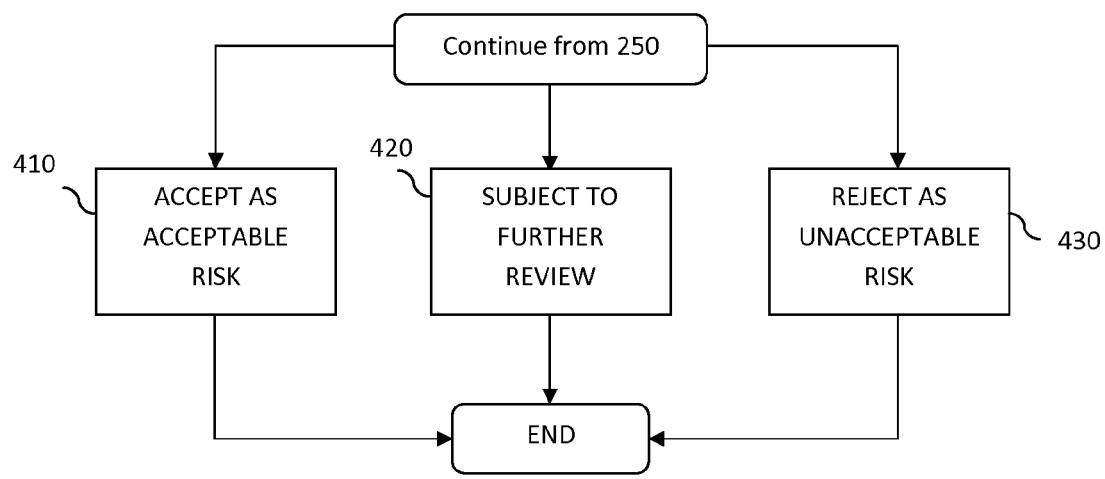
FIG. 4 is flow chart illustrating a method of determining a level of risk according to one or more embodiments of the present disclosure.

According to another embodiment, a method of assessing risks using a computer 110 is provided. The method includes receiving biographical information (operation 200) regarding at least one person at the computer 110. In operation 210, criminal information regarding the at least one person according to the biographical information is gathered from at least one data source 160, wherein the criminal information includes information relating to infractions, punishments for the infractions, and dispositions of the infractions. In operation 220, criminal information is automatically converted to assessment information, wherein a standardized numerical value is assigned to each infraction, a value of misdemeanor or felony is assigned to the punishment for each infraction, and a value of convicted, not convicted, or unknown is assigned to the disposition of each infraction. In operation 230, the biographical information, the criminal information, and the assessment information is stored on the computer 110. In operation 250 a level of risk corresponding to the at least one person according to the assessment information is determined. FIG. 4 illustrates a method of determining a level of risk (operation 250). In operation 410, the at least one person is accepted, in operation 420 the at least one person is subjected to further review, and in operation 430 the at least one person is rejected based on the level of risk. With regard to operation 420, the at least one person may be provisionally rejected based on a felony conviction, however the at least one person may subsequently be accepted in operation 410 if the felony that occurred over 10 years ago and the adjudication parameters do not disqualify applicants for felony convictions that occurred more than 10 years ago.

According to another embodiment, the method of assessing risks can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, Blu-Rays, flash drives, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present disclosure can be easily construed by programmers skilled in the art to which the present disclosure pertains.

Unless defined otherwise, all technical terms used herein have the same meaning as commonly understood by one of ordinary skill in the art to which this invention belongs. Any methods and materials similar or equivalent to those described herein also can be used in the practice or testing of the present disclosure It must be noted that as used herein and in the appended claims, the singular forms "a", "and", and "the" include plural references unless the context clearly dictates otherwise.

EXAMPLES

The following examples are put forth so as to provide those of ordinary skill in the art with a complete disclosure and description of how to make and use the present disclosure, and are not intended to limit the scope of what the inventors regard as their invention.

Example 1

Criminal Risk Assessment

The system of assessing risk may be used to perform the method of assessing risk in a criminal background check setting. For purposes of this example, Company A is a security company looking to hire new employees. Company A, which corresponds to client 180 in this example, wants to do a background check on the following job applicants Person A and Person B. Company A sends personal information regarding each of the job applicants to the computer 110. In this example, Company A sends Person A and Person B's names and social security numbers to the computer 110. Computer 110 then searches various data sources 160 for pertinent risk information. In this example, the computer 110 gathers Criminal History Record Checks (CHRC) files containing the criminal history, or rap sheets, for Person A and Person B that correspond to their personal information. The rap sheet for Person A includes a charge for "rape" with a sentence length of "10yrs" and a disposition of "glty." The rap sheet for Person B includes a charge for "forcible sexual intercourse" with a sentence length of "3650 days" and a disposition of "G." The charges on the rap sheets are infraction information, the sentence lengths are punishment information, and the dispositions are disposition information.

The computer 110 may run an algorithm in the risk assessment module 140 to convert the risk information on the rap sheets of Person A and B to assessment information. With regard to Person A, the infraction information "rape" is converted to a standardized infraction code "SEXUAL_ASSAULT" or NCIC code "11," which corresponds to this charge; the punishment information "10yrs" is converted to a standardized punishment code "FELONY" or "1"; and the disposition information "glty" is converted to a standardized disposition code "CONVICTED" or "2." With regard to Person B, the infraction information "forcible sexual intercourse" is converted to a standardized infraction code "SEXUAL_ASSAULT" or NCIC code "11," which corresponds to this charge; the punishment information "3650 days" is converted to a standardized punishment code "FELONY" or "1"; and the disposition information "G" is converted to a standardized disposition code "CONVICTED" or "2." The standardized infraction code, punishment code, and disposition code are stored on computer 110 as assessment information in either a text format (i.e., "SEXUAL_ASSAULT," "FELONY," "CONVICTED) or in a numerical format (i.e., "11," "1," "2").

Company A (client 180) sets adjudication parameters to determine the level of risk associated with Persons A and B via an adjudication module on the client 180 or the computer 110. For purposes of this example, Company A has set adjudication parameters on the computer 110 before the risk information was gathered. In this example, Company A has determined that any job applicant that has been convicted of a felony will be excluded from being considered for a position with the company. Both conditions, conviction and that the crime is a felony, need to be satisfied in order for Persons A or B to be excluded from consideration. Therefore, when the computer 110 determines the level of risk based on the adjudication parameters, the computer 110 finds that the level of risk associated with Person A and Person B is above a risk threshold. Therefore, the computer 110 rejects Person A and Person B's job applications for Company A. Company A is then informed of the results of the risk assessment regarding Person A and Person B. If Person A was not convicted of a felony, Person A would be accepted as an acceptable risk. If it was unknown as to whether Person A was convicted or not, then Person A's application would be subjected to further review.

Example 2

Airport Security Risk Assessment

The system of assessing risk may be used to perform the method of assessing risk in an airport security setting. For purposes of this example, Person A and Person B are trying to board an international flight from Europe to the United States. The Airport Security (AS) may send personal information regarding Persons A and B to the computer 110. In this example, AS sends Person A and Person B's names, social security numbers (if applicable), and passport numbers to the computer 110. Computer 110 then searches various data sources 160 for pertinent risk information. In this example, the computer 110 gathers Criminal History Record Checks (CHRC) files containing the criminal history, or rap sheets, for Person A and Person B that correspond to their personal information. The computer 110 also gathers files relating to Person A and B's nationality, immigration status, and travel history. The rap sheet for Person A includes a charge for "carrying a concealed explosive on an airplane" with a sentence length of "5y" and a disposition of "sentenced." Person B does not have a rap sheet. Person A is a United States citizen whose only travel has been to Europe. Person B is a Yemeni national who has traveled to Afghanistan and Pakistan in the last 12 months.

The computer 110 may run an algorithm in the risk assessment module 140 to convert the risk information relating to the criminal history of Person A and B to assessment information. With regard to Person A, the infraction information "carrying a concealed explosive on an airplane" is converted to a standardized infraction code "WEAPON_OFFENSES" or NCIC code "52," which corresponds to this charge; the punishment information "5y" is converted to a standardized punishment code "FELONY" or "1"; and the disposition information "sentenced" is converted to a standardized disposition code "CONVICTED" or "2." With regard to Person B, no conversion is necessary since Person B does not have a criminal history.

AS sets adjudication parameters to determine the level of risk associated with Persons A and B via an adjudication module on the client 180 or the computer 110. For purposes of this example, AS has set adjudication parameters on the computer 110 before the risk information was gathered. In this example, AS has determined that any traveler who has been convicted of bringing unauthorized weapons on a plane is to be prevented from boarding the plane. AS has also determined that any traveler who is from Yemen and has visited Afghanistan or Pakistan in the past year is to be prevented from boarding the flight. When the computer 110 determines the level of risk based on the adjudication parameters, the computer 110 finds that the level of risk associated with Person A and Person B is above a risk threshold. Therefore, the computer 110 rejects Person A and Person B, and AS is then informed of the results of the risk assessment regarding Person A and Person B. AS then prevents Person A and Person B from boarding the plane.

Example 3

Police Office Application

The system of assessing risk may be used to perform the method of assessing risk in a criminal background check setting. Police Department (PD), which corresponds to client 180 in this example, wants to do a background check on the following job applicants: Person A and Person B. The PD sends personal information regarding each of the job applicants to the computer 110. In this example, Company A sends Person A and Person B's names and social security numbers to the computer 110. Computer 110 then searches various data sources 160 for pertinent risk information. In this example, the computer 110 gathers Criminal History Record Checks (CHRC) files containing the criminal history, or rap sheets, for Person A and Person B that correspond to their personal information. The rap sheet for Person A includes a charge for "rape" with a sentence length of "10yrs" and a disposition of "afgh." The rap sheet for Person B includes two charges for "grand theft auto" with a sentence length of "days" and a disposition of "con." The charges on the rap sheets are infraction information, the sentence lengths are punishment information, and the dispositions are disposition information.

The computer 110 may run an algorithm in the risk assessment module 140 to convert the risk information on the rap sheets of Person A and B to assessment information. With regard to Person A, the infraction information "rape" is converted to a standardized infraction code "SEXUAL_ASSAULT" or NCIC code "11," which corresponds to this charge; the punishment information "10yrs" is converted to a standardized punishment code "FELONY" or "1"; and the disposition information "afgh" is converted to a standardized disposition code "UNKNOWN" or "0." With regard to Person B, the infraction information "grand theft auto" is converted to a standardized infraction code "STOLEN_VEHICLE" or NCIC code "24," which corresponds to this charge; the punishment information "days" is converted to a standardized punishment code "UNKNOWN" or "2"; and the disposition information "con" is converted to a standardized disposition code "CONVICTED" or "2." The standardized infraction code, punishment code, and disposition code are stored on computer 110 as assessment information in either a text format or in a numerical format.

The PD sets adjudication parameters to determine the level of risk associated with Persons A and B via an adjudication module on the client 180 or the computer 110. For purposes of this example, The PD has set adjudication parameters on the computer 110 before the risk information was gathered. In this example, the PD has determined that any job applicant that has been convicted of more than one charge of grand theft auto will be excluded from being considered for a position as a police officer with a cruiser. Both conditions, conviction and that the crime is a felony, need to be satisfied in order for Persons A or B to be excluded from consideration. Therefore, when the computer 110 determines the level of risk based on the adjudication parameters, the computer 110 finds that the level of risk associated with Person B is above a risk threshold. Therefore, the computer 110 rejects Person B's job applications to be a police officer with a cruiser at the PD. However, Person B may still be able to be accepted for another job in the PD. The PD is then informed of the results of the risk assessment regarding Person A and Person B. Person A may be accepted for the job as a police officer with police cruiser, and Person B may be accepted for a desk job with the PD.

While the present disclosure has been described with reference to the specific embodiments thereof, it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present disclosure. All such modifications are intended to be within the scope of the claims appended hereto.

What is claimed is:

1. A computer-based system for assessing risks, the system comprising:
    a storage device to
        receive, at a computer, personal information regarding at least one entity;
        receive, at the computer, risk information regarding the at least one entity according to the personal information from at least one data source, wherein the risk information includes infraction information, punishment information, and disposition information that correspond to the personal information of the at least one entity,
        store the personal information, the risk information, or assessment information on the computer; and
    a processor to automatically convert the risk information to assessment information using standardized codes by assigning numerical values including an infraction code that corresponds to the infraction information, a punishment code that corresponds to the punishment information, and a disposition code that corresponds to the disposition information.

2. The computer-based system according to claim 1, wherein the risk information further comprises:
    criminal history, civil history, terrorist watch lists, traffic violations, loan or debt delinquencies, outstanding wants or warrants, academic disciplinary history, or immigration status.

3. The computer-based system according to claim 1, further comprising:
    an adjudication module to determine a level of risk corresponding to the at least one entity according to the assessment information.

4. The computer-based system according to claim 3, wherein the level of risk corresponding to the at least one entity is determined according to adjudication parameters received by the adjudication module.

5. The computer-based system according to claim 4, wherein the adjudication parameters are received from a user and are input into the computer or received from a client over a network.

6. A method of assessing risks using a computer, the method comprising:
    receiving personal information regarding at least one entity at the computer;

gathering risk information regarding the at least one entity according to the personal information from at least one data source, wherein the gathering of the risk information includes obtaining infraction information, punishment information, and disposition information that correspond to the personal information of the at least one entity;

automatically converting the risk information to assessment information, wherein the automatically converting of the risk information to the assessment information includes converting the infraction information to an infraction code, the punishment information to a punishment code, and the disposition information to a disposition code by assigning standardized numerical values to the infraction information, the punishment information, and the disposition information; and storing the personal information, the risk information, or the assessment information in a memory of the computer.

7. The method according to claim 6, wherein the risk information comprises:

criminal history, civil history, terrorist watch lists, traffic violations, loan or debt delinquencies, outstanding wants or warrants, academic disciplinary history, or immigration status.

8. The method according to claim 6, further comprising:
determining a level of risk corresponding to the at least one entity according to the assessment information.

9. The method according to claim 8, wherein the level of risk corresponding to the at least one entity is determined according to adjudication parameters.

10. The method according to claim 9, further comprising:
receiving the adjudication parameters by inputting the adjudication parameters into the computer or receiving the adjudication parameters from a client over a network.

11. The method according to claim 6,
wherein the standardized infraction code is derived from infraction information by pre-processing the infraction information and using a predictive model to classify the infraction information into the infraction code along with a confidence factor for the classification;

wherein the standardized punishment code is derived from punishment information by pre-processing the punishment information and using the predictive model to classify the punishment information into the punishment code along with a confidence factor for the classification; and wherein the standardized disposition code is derived from disposition information by pre-processing the disposition information and using the predictive model to classify the disposition information into the disposition code along with a confidence factor for the classification.

12. The method according to claim 11, wherein the pre-processing of the infraction information, the punishment information, or the disposition information includes:

performing a number of text-string substitutions to normalize the language of the infraction information, the punishment information, or the disposition information;

removing unnecessary text from the infraction information, the punishment information, or the disposition information; and creating specific phrases based on the proximity of two or more words.

13. The method according to claim 11, wherein the predictive model is a statistical pattern learning model which is trained to predict classifications by using examples of text already classified.

14. A computer-readable recording medium containing computer-readable codes providing commands for computers to execute a process including:

receiving personal information regarding at least one entity at the computer;

gathering risk information regarding the at least one entity according to the personal information from at least one data source wherein the gathering of the risk information includes obtaining infraction information, punishment information, and disposition information that correspond to the personal information of the at least one entity;

automatically converting the risk information to assessment information; and storing the personal information, the risk information, and the assessment information on the computer;

wherein the automatically converting of the risk information to the assessment information includes converting the infraction information to an infraction code, the punishment information to a punishment code, and the disposition information to a disposition code by assigning standardized numerical values to the infraction information, the punishment information, and the disposition information.

* * * * *